No. 708,795. Patented Sept. 9, 1902.
E. T. BUTLER.
PHOTOGRAPHIC CAMERA FOR PRODUCING AND VIEWING IMAGES IN NATURAL COLORS.
(Application filed Dec. 7, 1900.)
(No Model.) 2 Sheets—Sheet 1.
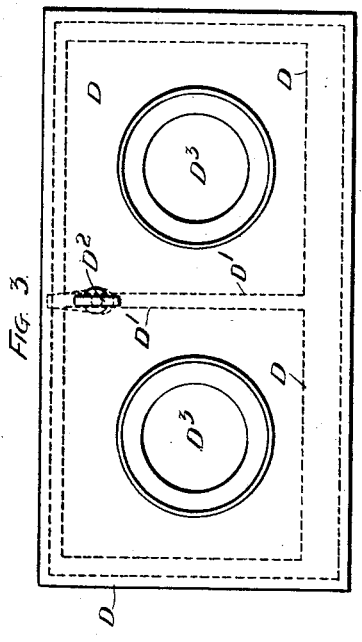
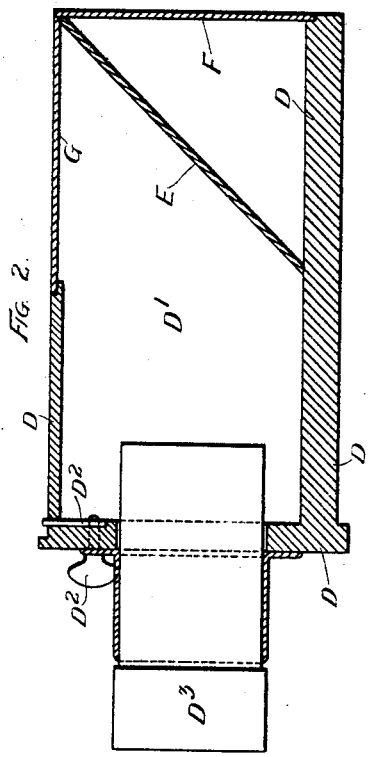
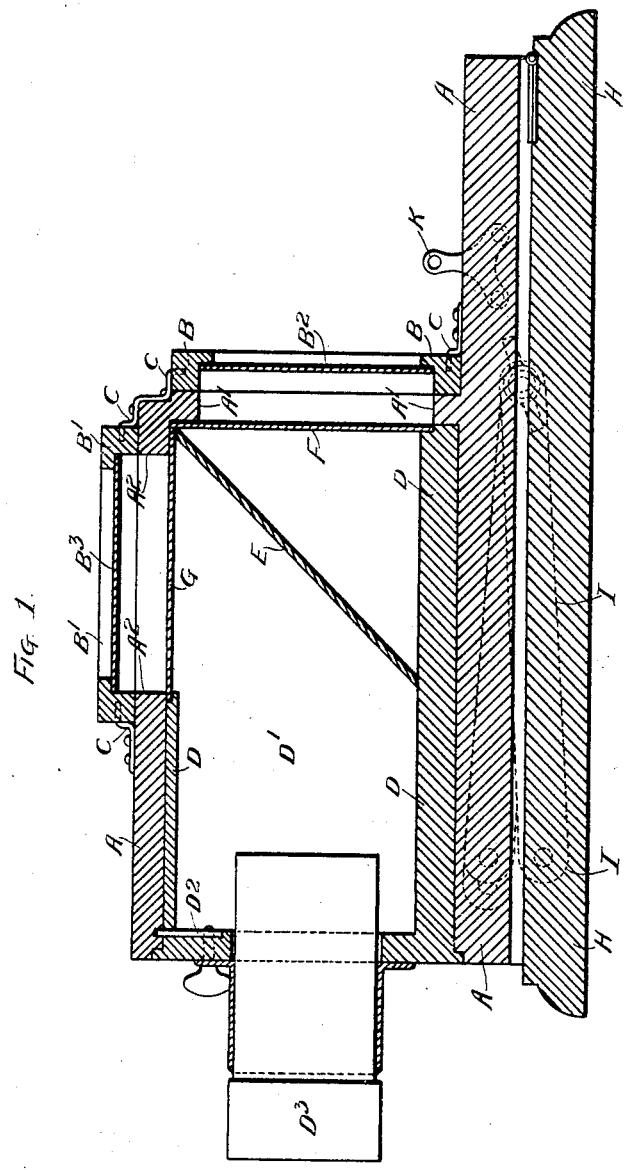
Witnesses:
C. Holloway
W. C. Pinckney
Inventor:
Edwin Tranter Butler,
By
Edmond Congar Brown
Attorney No. 708,795. Patented Sept. 9, 1902.
E. T. BUTLER.
PHOTOGRAPHIC CAMERA FOR PRODUCING AND VIEWING IMAGES IN NATURAL COLORS.
(Application filed Dec. 7, 1900.)
(No Model.) 2 Sheets—Sheet 2.
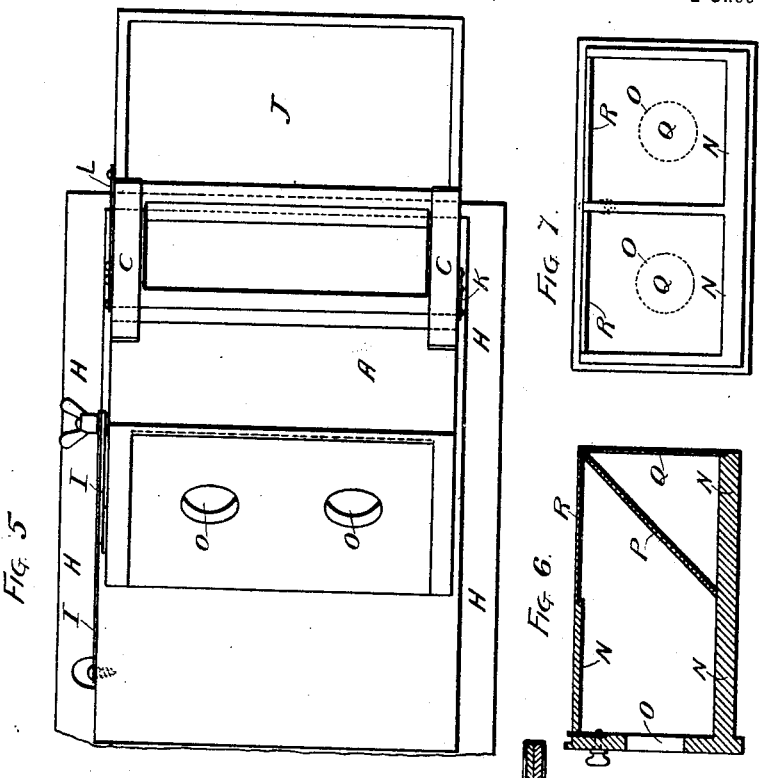
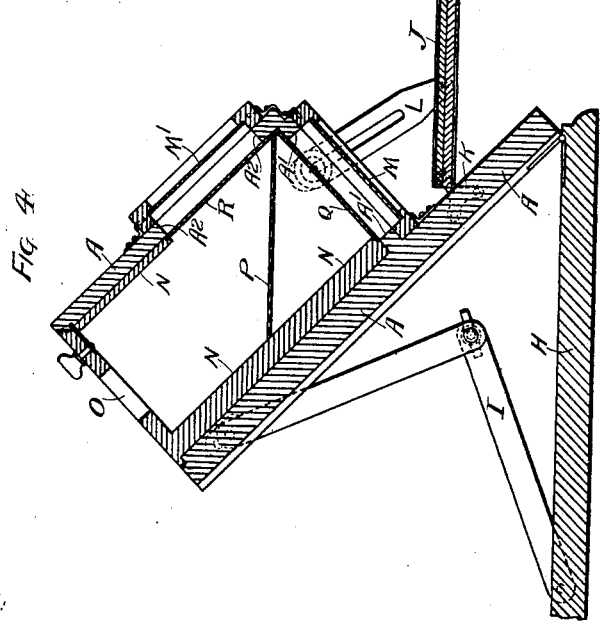
Witnesses:
C. Holloway
W. C. Pinckney
Inventor:
Edwin Tranter Butler
By Edmond Congar Brown
Attorney

UNITED STATES PATENT OFFICE.

EDWIN T. BUTLER, OF CAMBUSLANG, NEAR GLASGOW, SCOTLAND.

PHOTOGRAPHIC CAMERA FOR PRODUCING AND VIEWING IMAGES IN NATURAL COLORS.

SPECIFICATION forming part of Letters Patent No. 708,795, dated September 9, 1902.

Application filed December 7, 1900. Serial No. 39,022. (No model.)

*To all whom it may concern:*

Be it known that I, EDWIN TRANTER BUTLER, a citizen of the United Kingdom of Great Britain and Ireland, residing at Broomlea, Cambuslang, near Glasgow, Scotland, have invented certain new and useful Improvements in Photographic Cameras for Producing and Viewing Images in Natural Colors, (which have been patented in Great Britain, No. 9,936, dated May 30, 1900,) of which the following is a specification.

The invention simplifies the production of a picture having stereoscopic effect and shows in the instrument every color of the spectrum in due proportion or an image of any object in its natural colors.

The object of my invention is to provide a camera which with one pair of stereoscopic lenses will produce upon two plates two pairs of images at one exposure from the same point of view or will show the photographed images as one picture when used in the reverse way.

In the accompanying drawings, which illustrate the invention, Figure 1 is a vertical section of a stereoscopic color-camera constructed in accordance with my invention and designed also to be used as a stereoscope by the withdrawal of the inner portion, which is provided with lenses and constitutes the camera proper, and the substitution of a similarly-constructed portion having stereoscopic lenses, or the camera and stereoscope may form two separate instruments, as hereinafter described. Fig. 2 is a vertical section, and Fig. 3 an end elevation, of the camera proper shown separate from the outer casing, which latter is designed to form an outer casing as also to hold the sensitive plates or the transparencies taken from these, according as the instrument is being used as a camera or stereoscope. Fig. 4 is a vertical section, and Fig. 5 is a plan, of the instrument, showing the same in use as a stereoscope, a stereoscopic inner portion being substituted for the camera proper; and Figs. 6 and 7 show in longitudinal vertical section and end view, respectively, the stereoscopic inner portion separate from the casing.

Referring to Figs. 1, 2, and 3, the instrument (which is shown at Fig. 1 in use as a camera) consists of a box-like casing A, having orifices A' A², over which slides B B', carrying sensitive plates B² B³, are fitted, these slides being retained in position on the casing A by guide-strips C or otherwise. Within this casing A a removable camera D is fitted or other suitable means of holding the reflector at an angle of forty-five degrees and secured by a catch D² or other device to said casing, the camera D being divided longitudinally by a web D' and furnished with lenses D³. Colored screens may be placed either before or behind the lenses D³ or both before and behind, and near the end remote from the lenses D³ a transparent reflector E is placed at an angle of forty-five degrees to the bottom of the camera-body, this reflector being either of clear or colored glass. Horizontally above or below and vertically behind the reflector E colored screens F and G are fitted either in orifices in the camera D or in the orifices A' A² (already referred to) in the outer casing A, the screens F G being arranged in pairs, one of each pair being opposite a lens immediately in front of and under the sensitive plates B² B³, respectively, and being arranged to receive either transmitted or reflected light from the reflector. The image passing through either lens is, by means of the colored screens in front of or behind or both in front of and behind one of the lenses D³, filtered of half—say the warm—the rays of the object, part of the filtered rays then passing through the transparent reflector E and part being reflected upward. The transmitted rays before reaching the sensitive plate B², on which they are to be focused, are again filtered by that portion of the colored screen F opposite this lens, this portion of the colored screen representing one-fourth of the spectrum colors. That part of the rays passing through this lens and reflected upward by the reflector E before being focused upon the sensitive plate B³ is again filtered by means of that portion of the screen G corresponding to the portion of the screen F above referred to, this portion of the screen G also representing one-fourth of the spectrum colors and being the complementary colors to those of the screen F. The image passing through the other lens D³ is filtered, transmitted, reflected, and again filtered in exactly the same manner as already described at the same time, so that four images are taken simultaneously at one exposure on separate portions of a pair of plates, from which transparencies are subsequently prepared for viewing the picture.

Referring to Figs. 4, 5, 6, and 7, for the purpose of using the instrument as a stereoscope the casing A is preferably hinged to a sole H and is arranged to be secured at any angle to the latter, as shown at Figs. 4 and 5, by means of jointed arms I. A mirror or reflector J is also provided and is pivoted in bearings K, secured upon the casing A, this reflector J being adjustable by means of the slotted arm L to reflect the light at the desired angle. An inner box N, (shown separate at Figs. 6 and 7,) having stereoscopic lenses in orifices O, but otherwise constructed exactly as the camera D, with reflector P and colored screens Q R, is fitted within the casing A, and the transparencies M M', taken from the negatives $B^2$ $B^3$, are substituted for these negatives in the retaining-strips C when the instrument is used for this purpose. The casing A may be made entirely separate from the sole H or be removably hinged thereto, if desired.

Instead of combining in the manner already described the camera for producing the negative representations and the stereoscope for viewing the transparencies taken from the negatives in one instrument, these may be made separately, with their colored screens, reflectors, and holders for the sensitive plates or transparencies, as the case may be, integral with the camera or stereoscope.

Having now described my invention, what I claim, and desire to secure by Letters Patent, is—

1. In a stereoscopic camera fitted with a slide in the usual orifice at the rear end of the camera-body and adapted to carry a sensitive sheet, the combination therewith of a slide placed in an orifice in the roof of the camera-body and carrying a sensitive sheet, colored screens combining all the colors of the spectrum in due proportion, interposed between the lenses and the sensitive sheets, and reflectors inclined at forty-five degrees to said screens as and for the purpose set forth.

2. In a stereoscopic camera fitted with a slide in the usual orifice at the rear end of the camera-body and adapted to carry a sensitive sheet, the combination therewith of a slide placed in an orifice in the roof of the camera-body and carrying a sensitive sheet, colored screens interposed between the lenses and the upper sensitive sheet, and inclined transparent colored plates interposed between the lenses and the rear sensitive sheet, said inclined plates serving as reflectors and screens as and for the purpose set forth.

In witness whereof I have hereunto set my hand in presence of two witnesses.

EDWIN T. BUTLER.

Witnesses:
  WALLACE FAIRWEATHER,
  JNO. ARMSTRONG, Jr.